United States Patent [19]
Woodward et al.

[11] Patent Number: 4,665,602
[45] Date of Patent: May 19, 1987

[54] PULLER FOR INJECTOR NOZZLES FOR MACK HEADS

[76] Inventors: Tommy J. Woodward; Frank Serie, both of Rte. 1, Box 24, Sandy Hook, Miss. 39478; George Spector, 233 Broadway, RM 3615, New York, N.Y. 10007

[21] Appl. No.: 820,973

[22] Filed: Jan. 22, 1986

[51] Int. Cl.[4] .............................................. B23P 19/04
[52] U.S. Cl. ....................................................... 29/254
[58] Field of Search ................. 29/264, 275, 254, 259, 29/263; 254/103

[56] References Cited

U.S. PATENT DOCUMENTS

| | | | |
|---|---|---|---|
| 4,265,010 | 5/1981 | Doss et al. | 254/103 |
| 4,283,827 | 8/1981 | Abel | 29/263 |
| 4,299,020 | 11/1981 | Grego | 29/259 |

*Primary Examiner*—Robert C. Watson

[57] ABSTRACT

A puller tool for removing an injector from a mack head is provided and consists of a plate that holds a rotatable head and threadably receives a pair of oppositely positioned bolts. The head threads into a central passage of the injector while the bolts thread into threaded mounting holes in the injector. An elongated shank holds a slide hammer between the head and an anvil whereby movement of the slide hammer against the anvil causes an outward force to be applied to the injector to remove the same from the mack head.

1 Claim, 4 Drawing Figures

PULLER FOR INJECTOR NOZZLES FOR MACK HEADS

BACKGROUND OF THE INVENTION

The instant invention relates generally to automotive tools, and more specifically it relates to a puller tool for removing an injector from a mack head.

Numerous automotive tools have been provided in prior art that are adapted to remove various parts from engines. For example, U.S. Pat. Nos. 3,274,647; 3,945,104 and 4,110,886 all are illustrative of such prior art. While these units may be suitable for the particular purpose to which they address, they would not be as suitable for the purposes of the present invention as heretofore described.

SUMMARY OF THE INVENTION

A principle object of the present invention is to provide a puller tool for removing an injector from a mack head which can be threaded into the injector and operated in such a manner that the injector can be removed from the mack head in a manner of time and with a minimum of effort.

Another object is to provide a puller tool for removing an injector from a mack head with no damage to the injector.

An additional object is to provide a puller tool for removing an injector from a mack head which has sufficient adjustability and a minimum of parts to permit it to be employed in removing the injector without waste of time and labor.

A further object is to provide a puller tool for removing an injector from a mack head that is economical in cost to manufacture.

A still further object is to provide a puller tool for removing an injector from a mack head that is simple and easy to use.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
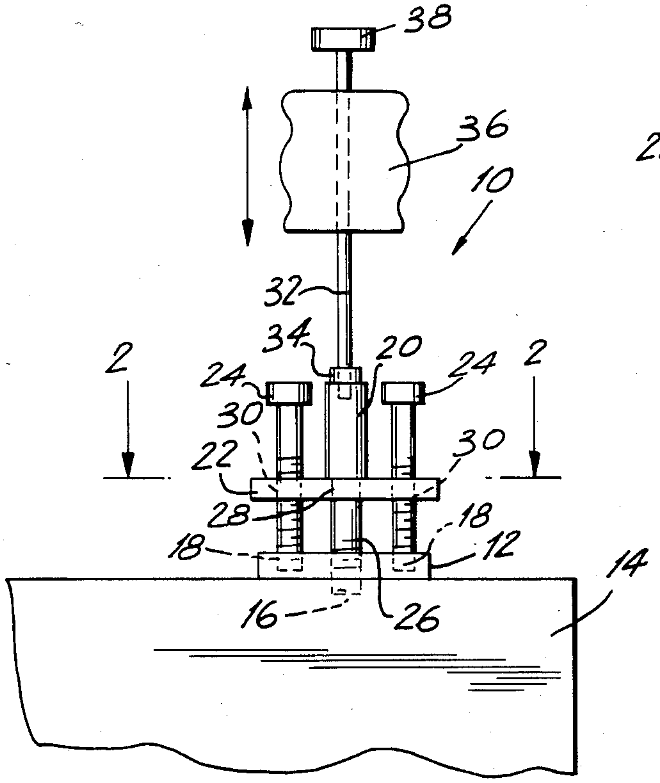
FIG. 1 is a front view of the invention in position to remove an injector from a mack head.
Figure 2:
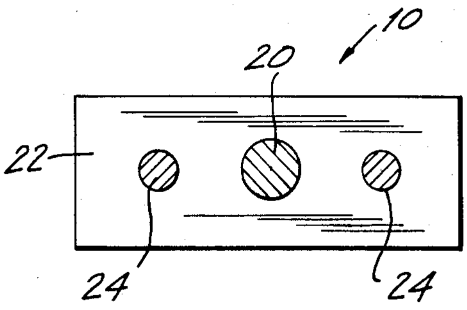
FIG. 2 is a cross sectional view taken along line 2—2 in FIG. 1.

Turning now descriptively to the drawings, in which similar reference characters denote similar elements throughout the several views, FIGS. 1 and 2 illustrate a puller tool 10 for removing an injector 12 from a mack head 14 in which the injector has a threaded central passage 16 and a pair of oppositely positioned threaded mounting holes 18, 18. The puller tool 10 includes a head 20, a plate 22 and a pair of bolts 24, 24.

The head 20 has a cylindrical threaded bottom end 26 of such diameter as to threadably fit within outer end of the threaded central passage 16 of the injector 12.

The plate 22 has a central bore 28 and a pair of oppositely positioned threaded openings 30, 30. The plate 22 is rotatably affixed to the head 20 at the central bore 28.

Each of the bolts 24 threadably engages one of the threaded openings 30 in the plate 22 and one of the threaded mounting holes 18 in the injector.

An elongated shank 32 is threadably affixed to top end 34 of the head 20 and extends axially upward from the head 20.

A slide hammer 36 is slideably disposed on the elongated shank 32. An anvil 38 is affixed to the elongated shank 32 in such a position as to entrap the slide hammer 36 between itself and the head 20. The distance between the top end 34 of the head 20 and the anvil 38 is great enough so that the slide hammer 36 can be reciprocatingly slid along the elongated shank 32 to repeatedly strike the anvil 38 and thus extract the injector 12 from the mack head 14.

Figure 3:
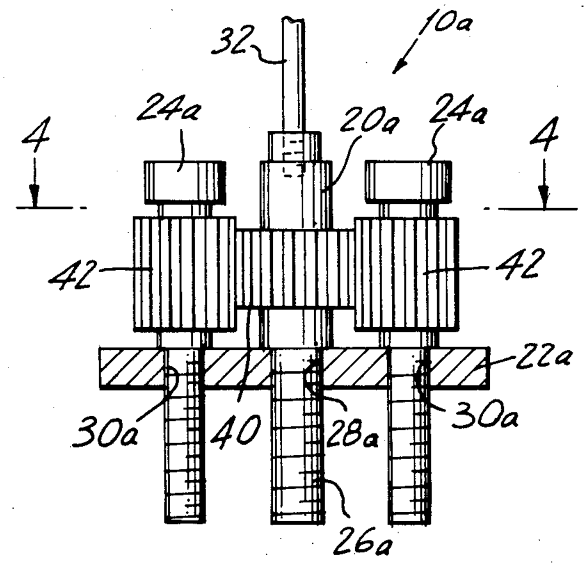
FIG. 3 is a front view of a modification with parts broken away whereby gears are provided to turn the bolts.
Figure 4:
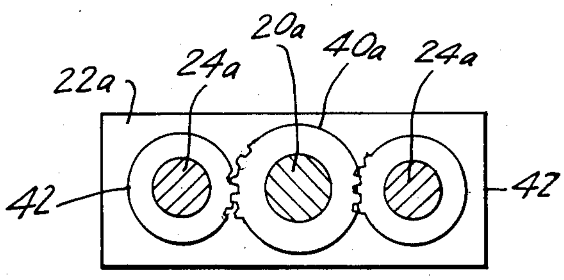
FIG. 4 is a cross sectional view taken along line 4—4 in FIG. 3.

FIGS. 3 and 4 show a modified puller tool **10*a*. The injector has a right handed threaded central passage and a pair of oppositely positioned left handed threaded mounting holes (not shown). The puller tool 10*a* includes a head 20*a* that has a drive gear 40 formed thereon and a cylindrical right handed threaded bottom end 26*a*** of such diameter as to threadably fit within outer end of the right handed threaded central passage of the injector.

The plate **22*a* has a central right handed threaded bore 28*a* and a pair of oppositely positioned left handed threaded openings 30*a*, 30*a*. The plate 22*a* is adjustably affixed to the head 20*a* at the central right handed threaded bore 28*a***.

The pair of bolts **24*a*, 24*a* have driven gears 42, 42 formed thereon. Each bolt 24*a* threadably engages one of the left handed threaded openings 30*a* in the plate 22*a* and one of the left handed threaded mounting holes in the injector. When the head 20*a* is threaded within the central passage of the injector the drive gear 40 will engage and turn the driven gears 42, 42 on the bolts 24*a*, 24*a*** to thread the bolts therein.

The rest of the puller tool **10*a* is the same as puller tool 10 which is the elongated shank 32, the slide hammer 36 and anvil 38**.

In the operation of the puller tool 10 when the injector 12 becomes unserviceable and must be removed from the mack head 14, bolts holding a cap must be unscrewed from the threaded mounting holes 18, 18 and a threaded sleeve must be unscrewed from the threaded central passage 16. The bottom end 26 of the head 20 and the bolts 24 and 24 can then be threaded in the cap and sleeves place in the injector 12 so that the injector can be removed by action of the slide hammer 36 against the anvil 38 on the elongated shank 32.

The operation of the puller tool **10*a* is in a similar manner as puller tool 10 except when the bottom end 26*a* is threaded into the threaded central passage the bolts 24*a* and 24*a*** will be threaded into the threaded mounting holes at the same time. Then the injector can be removed as above.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A puller tool for removing an injector from a mack head in which said injector has a right handed threaded central passage and a pair of oppositely positioned left handed threaded mounting holes, said puller tool comprising:

(a) a head having a drive gear formed thereon and a cylindrical right handed threaded bottom end of such diameter as to threadably fit within outer end of said right handed threaded central passage of said injector;

(b) a plate having a central right handed threaded bore and a pair of oppositely positioned left handed threaded openings, said plate adjustably affixed to said head at said central right handed threaded bore;

(c) a pair of bolts having driven gears formed thereon, each of which threadably engages one of said left handed threaded openings in said plate and one of said left handed threaded mounting holes in said injector so that when said head is threaded within said central passage of said injector, said drive gear will engage and turn said driven gears on said bolts to thread said bolts therein;

(d) an elongated shank threadably affixed to top end of said head and extending axially upward from said head;

(e) a slide hammer slideably disposed on said elongated shank; and (f) an anvil affixed to said elongated shank in such a position as to entrap said slide hammer between itself and said head, distance between said top end of said head and said anvil being great enough so that said slide hammer can be reciprocatingly slid along said elongated shank to repeatedly strike said anvil and thus extract said injector from said mack head.

* * * * *